(12) United States Patent
Sharma et al.

(10) Patent No.: US 10,915,855 B2
(45) Date of Patent: Feb. 9, 2021

(54) ON-DEMAND PURCHASING AND DELIVERY ECOSYSTEM

(71) Applicant: MASTERCARD INTERNATIONAL INCORPORATED, Purchase, NY (US)

(72) Inventors: Aarti Sharma, Saint Charles, MO (US); David Weis, Boerne, TX (US); Michael Thomas McNamara, New York, NY (US); Steven Bruce Oshry, Tarrytown, NY (US); Heather Marie Kowalczyk, Oakland, NJ (US); Michael J. Cardamone, New Windsor, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 460 days.

(21) Appl. No.: 15/842,595

(22) Filed: Dec. 14, 2017

(65) Prior Publication Data
US 2019/0188639 A1 Jun. 20, 2019

(51) Int. Cl.
*G06Q 20/10* (2012.01)
*G06Q 10/08* (2012.01)
*G06F 3/0482* (2013.01)

(52) U.S. Cl.
CPC ......... *G06Q 10/0836* (2013.01); *G06Q 20/10* (2013.01); *G06F 3/0482* (2013.01)

(58) Field of Classification Search
CPC ..... G06Q 20/00; G06Q 20/10; G06Q 10/0836

USPC ......................................................... 705/39
See application file for complete search history.

(56) References Cited

U.S. PATENT DOCUMENTS

| | | | |
|---|---|---|---|
| 8,706,542 B2 | 4/2014 | O'Meara et al. | |
| 2001/0047306 A1* | 11/2001 | Garretson | G06Q 20/201 705/20 |
| 2003/0040944 A1 | 2/2003 | Hileman | |
| 2004/0030572 A1 | 2/2004 | Campbell et al. | |
| 2004/0117384 A1* | 6/2004 | Ray | G06Q 20/12 |
| 2006/0253339 A1 | 11/2006 | Singh et al. | |
| 2007/0073552 A1 | 3/2007 | Hileman | |
| 2011/0288958 A1 | 11/2011 | Obasanjo et al. | |
| 2016/0034828 A1 | 2/2016 | Sarawgi et al. | |

(Continued)

*Primary Examiner* — Robert R Niquette
*Assistant Examiner* — Liz P Nguyen
(74) *Attorney, Agent, or Firm* — Armstrong Teasdale LLP

(57) ABSTRACT

An on-demand ecosystem (ODE) computing device for integrating on-demand delivery services with purchase transactions is provided. The ODE computing device receives item data from a registered merchant, and receives availability data from at least one registered carrier. The ODE computing device further provides a searchable interface that enables a user to search for item data from the registered merchant, and receives a selected item from the user via the searchable interface. The selected item is offered for sale by the registered merchant and includes a selected pick-up location. The selected item is to be delivered to the user from the selected pick-up location. The ODE computing device also allows either the registered merchant or the user to select one of the at least one registered carriers, and processes a payment transaction for the selected item including an item price and a delivery fee.

15 Claims, 7 Drawing Sheets

(56) References Cited

U.S. PATENT DOCUMENTS

2016/0086128 A1* 3/2016 Geiger ........... G06Q 10/063118
                                                    705/7.17
2016/0210591 A1* 7/2016 Lafrance ................. G06F 16/29

* cited by examiner

ON-DEMAND PURCHASING AND DELIVERY ECOSYSTEM

BACKGROUND

This disclosure relates generally to on-demand services and, more specifically, to network-based systems and methods for delivery services tied to purchase transactions via an on-demand ecosystem.

On-demand services are increasingly desirable by consumers, particularly when it comes to obtaining an item as soon as it is purchased. In a best case scenario, a consumer would be able to find the exact item they want at a nearby merchant, purchase it, and take it with them immediately after purchasing. Additionally, this best case scenario assumes the consumer would also have the time and transportation means to get to and from the merchant, as well as to transport the item after purchase. However, purchasing an item and obtaining the item immediately is not always possible. For instance, if a consumer wants a specific item right away (e.g., same day), they may be able to find local merchants that have the item in stock (such as by searching merchant inventory online or by calling the merchant) and would need to go pick up the item themselves. If the item is relatively large (such as a piece of furniture), the consumer may need to rent a truck, or borrow one from a friend or family member, etc. in order to transport the item. As an alternative, the consumer may find the item at an online merchant and be forced to pay an expensive fee for same-day shipping. In some cases, same-day shipping may not even be available with some merchants, so a consumer would be forced wait longer for next-day or 2-day shipping, likely still with an expensive shipping fee. Accordingly, an on-demand ecosystem that connects consumers, merchants, and delivery carriers is needed where delivery services (especially same-day, relatively short-distance deliveries) are integrated as part of the item purchase transaction.

BRIEF DESCRIPTION OF THE DISCLOSURE

In one aspect, an on-demand ecosystem computing device is provided. The on-demand ecosystem computing device includes a processor in communication with a memory. The processor programmed to receive item data from a registered merchant that includes one or more pick-up locations, receive availability data from at least one registered carrier, and to display a searchable interface to a user that enables the user to search for item data from the registered merchant. The processor is further programmed to receive a selected item from the user via the searchable interface, wherein the selected item is offered for sale by the registered merchant and includes a selected pick-up location and wherein the selected item is to be delivered to the user from the selected pick-up location, and determine whether the registered merchant has selected to deliver the selected item to the user. When the registered merchant has selected to deliver the selected item, the processor is programmed to provide the availability data from the at least one registered carrier to the registered merchant and allow the registered merchant to select one of the at least one registered carriers. When the registered merchant has not selected to deliver the selected item, the processor is programmed to provide the availability data from the at least one registered carrier to the user and allow the user to select one of the at least one registered carriers. The processor is also programmed to process a payment transaction for the selected item that includes an item price and a delivery fee.

In another aspect, a method for providing an on-demand ecosystem is provided. The method is performed using an on-demand ecosystem computing device including a processor in communication with a memory. The method includes receiving item data from a registered merchant that includes one or more pick-up locations, receiving availability data from at least one registered carrier, and displaying a searchable interface to a user that enables the user to search for item data from the registered merchant. The method further includes receiving a selected item from the user via the searchable interface, wherein the selected item is offered for sale by the registered merchant and includes a selected pick-up location and wherein the selected item is to be delivered to the user from the selected pick-up location, and determining whether the registered merchant has selected to deliver the selected item to the user. When the registered merchant has selected to deliver the selected item, the method includes providing the availability data from the at least one registered carrier to the registered merchant and allowing the registered merchant to select one of the at least one registered carriers. When the registered merchant has not selected to deliver the selected item, the method includes providing the availability data from the at least one registered carrier to the user and allowing the user to select one of the at least one registered carriers. The method also includes processing a payment transaction for the selected item that includes an item price and a delivery fee.

In yet another aspect, a non-transitory computer-readable storage medium having computer-executable instructions embodied thereon is provided. When executed by an on-demand ecosystem (ODE) computing device including at least one processor coupled to a memory, the computer-executable instructions cause the ODE computing device to receive item data from a registered merchant that includes one or more pick-up locations, receive availability data from at least one registered carrier, and display a searchable interface to a user that enables the user to search for item data from the registered merchant. The computer-executable instructions further cause the ODE computing device to receive a selected item from the user via the searchable interface, wherein the selected item is offered for sale by the registered merchant and includes a selected pick-up location and wherein the selected item is to be delivered to the user from the selected pick-up location, and determine whether the registered merchant has selected to deliver the selected item to the user. When the registered merchant has selected to deliver the selected item, the computer-executable instructions cause the ODE computing device to provide the availability data from the at least one registered carrier to the registered merchant and allow the registered merchant to select one of the at least one registered carriers. When the registered merchant has not selected to deliver the selected item, the computer-executable instructions cause the ODE computing device to provide the availability data from the at least one registered carrier to the user and allow the user to select one of the at least one registered carriers. The computer-executable instructions also cause the ODE computing device to process a payment transaction for the selected item that includes an item price and a delivery fee.

BRIEF DESCRIPTION OF THE DRAWINGS

FIG. 1 is an example multi-party payment card processing system that may be used to provide data to the system described herein.

FIG. 2 is an example of an on-demand (OD) system including an on-demand ecosystem (ODE) computing device.

FIG. 3 is an example flow diagram illustrating the flow of data between various components of the OD system shown in FIG. 2.

FIG. 4 illustrates an example configuration of a remote device for use in the system shown in FIG. 2.

FIG. 5 illustrates an example configuration of a server system for use in the system shown in FIG. 2.

FIG. 6 is a flowchart of an example process for providing an on-demand ecosystem using the system shown in FIG. 2.

FIG. 7 is a diagram of components of an example computing device that may be used in the OD system shown in FIG. 2.

Figure 1:
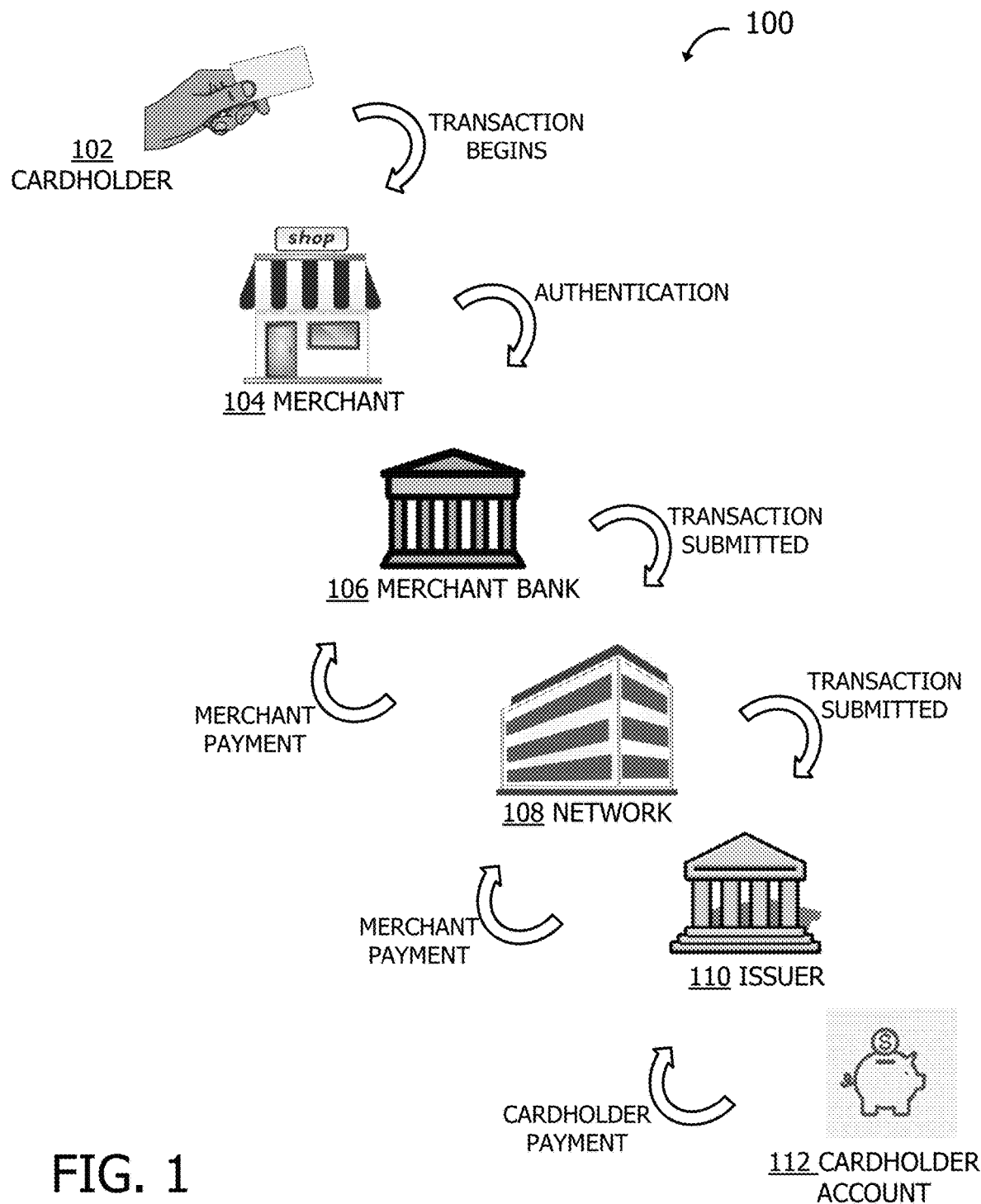
FIGS. 1-7 show example embodiments of the methods and systems described herein.

Like numbers in the Figures indicates the same or functionally similar components. Although specific features of various embodiments may be shown in some figures and not in others, this is for convenience only. Any feature of any figure may be referenced and/or claimed in combination with any feature of any other figure.

DETAILED DESCRIPTION OF THE DISCLOSURE

The embodiments described herein include an on-demand (OD) system, an on-demand ecosystem (ODE) computing device, and methods for providing an on-demand ecosystem that ties delivery services to the purchase of an item. In the exemplary embodiment, an on-demand ecosystem includes a merchant (e.g., a supplier or seller), a user (e.g., a consumer or buyer), and a carrier who will deliver an item or product to the user. Merchants and carriers enroll or register themselves with the system (e.g., with the ODE computing device). Registered merchants provide the system with item data for items being offered for sale, including pick-up locations at which each item is located. Registered carriers provide the system with availability data, including days, times, and geographic areas in which they are available to pick-up items and make deliveries. Users can browse or search items from registered merchants via an interface and select an item to purchase. The system allows a merchant or a user to select and contract with the carrier to deliver the selected item to the user. Item delivery is integrated into the purchase transaction, such that payment for delivery is handled by the system at the time of purchase of the item. Because delivery carrier contracting is handled at the time of the purchase, the purchase may only be completed if a carrier has been selected and contracted with at an agreed upon price. However, there is currently no system capable of providing a purchasing experience that includes delivery service dependent items where delivery services are integrated into the payment transactions, particularly in the case of same day, relatively short-distance deliveries. The systems and methods described herein resolve this deficiency.

In the example embodiment, the OD system includes an on-demand ecosystem (ODE) computing device that includes and/or is in communication with a merchant computing device, a carrier (e.g., delivery carrier) computing device, a user (e.g., a consumer) computing device, and a payment network. The ODE computing device is configured to (i) receive item data from a registered merchant, (ii) receive availability data from a registered carrier, (iii) display a searchable interface to a user that enables the user to search for item data, (iv) receive a selected item from the user via the searchable interface, wherein the selected item is offered for sale by the registered merchant and includes a selected pick-up location and is to be delivered to the user from the selected pick-up location, (v) determine whether the registered merchant has selected to deliver the selected item to the user, (vi) provide the availability data from the registered carrier to either the registered merchant or the user and allow either the registered merchant or the user to select a registered carrier, and (vii) process a payment transaction for the selected item that includes an item price and a delivery fee. The ODE computing device is a specifically configured computing device that is capable of functioning as described herein, including a dedicated computing device associated solely with the OD system. The ODE computing device includes a processor in communication with a memory.

The OD system further includes a database in wired and/or wireless communication with the ODE computing device. In some embodiments, the database is a centralized database that is integral to the ODE computing device, or in alternative embodiments the database is a separate component and external to the ODE computing device. The database is accessible to the ODE computing device and is configured to store and/or otherwise maintain a variety of information, as described further herein. For example, the database may store merchant item data, carrier availability data, verification rules, carrier selection rules, payment processing rules and/or any other information. The database is configured to store data to more efficiently provide on-demand carrier availability data to enable carrier selection and complete the item purchase process. Subsequently, based on the most recently selected/contracted carrier, the carrier availability may be updated and re-cached to the database.

According to one or more example embodiments, the on-demand ecosystem computing device enables merchants and carriers to enroll or register with the system. Registration may include creation of carrier and merchant profiles. Carrier profiles may include carrier-related data, such as name, address, locations, delivery type(s) (e.g., small item or large item), delivery vehicle type(s) (e.g., car, truck), delivery vehicle identifier(s) (e.g., make, model, color, license plate numbers), delivery vehicle GPS identifier(s), delivery vehicle driver identifier(s) (e.g., driver names, license numbers, mobile device contact information such as phone numbers, photographs, etc.), and contact information. Carrier-related data included in the profile of a registered carrier may be displayed to a user or merchant along with carrier availability data when carrier selection takes place, and/or may be included as part of availability data provided by the carrier. Merchant profiles may include various merchant-related data, such as name, address, locations, item type(s) (e.g., categories of products offered for sale), and contact information. Merchant-related data included in the profile of a registered merchant may be displayed to a user or merchant along with item data when a user searches or browses via the searchable interface, and/or may be included as part of item data provided by the merchant to aid the user in item selection.

In some embodiments, merchant and carrier registration may further include a verification process. For instance, the ODE computing device may verify the legitimacy of the merchant's or carrier's business. Verification may include business address checks and location checks. Additionally or alternatively, verification may include comparing merchant-submitted data with merchant data in, for example, the Better Business Bureau data warehouse, or other data warehouse to see if the merchant is a valid merchant. Verification may also include delivery driver background checks and driving record checks. Accordingly, only merchants and carriers that pass the verification process will be registered by the ODE computing device and have their respective items and delivery services offered via the OD system. By using the OD system, users can have increased confidence in the goods and services being provided because registered carriers and merchants have passed the verification process.

In some embodiments, users (e.g., consumers/buyers) may also be enabled to register with the ODE computing device. In these embodiments, registered users may create a user profile and input identifying data (such as name, address, etc.) and payment data (such as card/account information) that will be saved in the database associated with the ODE computing device and used for payment transactions handled by the ODE computing device. In these embodiments, registered users may receive discounts, coupons, rebates, rewards, reward points, or other incentives for item purchases and deliveries made via the OD system. In other embodiments, a user may prefer not to register with ODE computing device, and may still be able to utilize the OD system for item purchase and delivery (e.g., as a 'guest' user).

In the example embodiment, the ODE computing device is configured to receive item data from a registered merchant. Item data generally includes a listing of items offered for sale by the merchant, as well as the physical locations at which each item is available for pick-up. Item data may further include details about each item, such as an item name, an image of the item, a description of the item, an item price, and an item identifier (e.g., a stock keeping unit (SKU) number, bar code, catalog number, etc.). In some embodiments, the item price may be an estimated item price, such as when the merchant prefers to select the delivery carrier and will include the delivery fee in the item price.

The ODE computing device is also configured to receive availability data from a registered carrier. In providing availability data, the carrier may provide a carrier identifier (e.g., name, address, locations), available delivery days, available delivery times, available delivery vicinity (e.g., geographic locations and/or boundaries, cities, towns, counties, neighborhoods, streets, etc.), minimum and/or maximum trip distance (e.g., distance from pick-up location to delivery location), a delivery fee or fee range, a delivery vehicle type (e.g., compact car, mid-size car, small truck (e.g., Subaru Brat, Ford Ranger), large truck (e.g., Ford F150, F250, F350), a delivery vehicle identifier (make, model, color, license plate number), a delivery vehicle GPS identifier, and a delivery vehicle driver identifier (e.g., driver name, driver license number, photograph, mobile device contact information such as phone number).

The ODE computing device is then configured to display a searchable interface to a user that enables the user to search (or browse) for item data from the registered merchant. When a user wishes to purchase an item, the user may search or browse the searchable interface to view items offered for sale by any or all of the registered merchants. The user may search or browse, for example, by merchant, item type/category, item name, item price, etc. Various item filtering and/or sorting criteria may be provided to the user via the searchable interface.

In the example embodiment, the ODE computing device is configured to receive a selected item from the user via the searchable interface. The selected item is an item being offered for sale by a registered merchant, includes a selected pick-up location, and is to be delivered to the user from the selected pick-up location. Prior to processing a payment transaction for the selected item, a registered carrier will be contracted (by either the merchant or the user, as discussed in further detail below) to deliver the selected item based on availability data provided to the ODE computing device by the carrier.

In the example embodiment, the ODE computing device is then configured to determine whether the registered merchant has selected to deliver the selected item to the user. Depending on the embodiment, either the merchant selling the selected item or the user will select a carrier to deliver the item. In some embodiments, when registering with the ODE computing device, a registered merchant may indicate that they will always, sometimes, or never select a delivery carrier for each item selected for purchase by a user. For instance, a merchant may indicate that they will select a deliver carrier for smaller items but not for larger items. As another example, a merchant may indicate other item criteria (e.g., item price, pick-up location) for which they will or will not select a carrier. In other embodiments, the merchant may not make any indication regarding carrier selection during registration with the ODE computing device. In some embodiments, a merchant may prefer to decide whether or not to select a carrier on a case-by-case basis. For example, when a selected item is received, the ODE computing device may query the merchant regarding whether they will select a carrier for that particular item. In embodiments when the merchant has selected to deliver the selected item, the ODE computing device provides the availability data from the registered carriers to the merchant and allows the merchant to select one of the carriers. Alternatively, in embodiments when the registered merchant has not selected to deliver the selected item, the ODE computing device provides the availability data from the registered carriers to the user and allows the user to select one of the registered carriers. In some embodiments, the ODE computing device may filter carriers according to availability data prior to providing the availability data to a merchant or user for carrier selection. For instance, if a user selects an item for purchase and delivery on a Saturday, the ODE computing device may not provide availability data for carriers that have indicated they do not deliver on Saturdays or weekends. Therefore only carriers with availability data that is applicable to delivering the selected item at the relevant day, time, location, etc. will be displayed to the merchant or user for carrier selection.

In some embodiments, subsequent to receiving a carrier selection from a merchant or user, the ODE computing device may query the selected carrier to accept or decline delivery of the selected item from the pick-up location to the user. In these embodiments, if the initially selected carrier declines to deliver the selected item, the ODE computing device will allow a different one of the registered carriers to be selected by the merchant or user. Once a registered carrier has been selected (and has been accepted or has not been declined, according to the embodiment), the ODE computing device is configured to transmit a delivery task to the selected carrier, wherein the delivery task includes at least the selected pick-up location, a selected item identifier, and a delivery location. In some embodiments, the ODE computing device will further update the availability data of the selected carrier based on the delivery task transmitted to the selected carrier. That is, availability data of the selected carrier will be updated to omit an allotted time during which the carrier has already been contracted to deliver a selected item. In some embodiments, the ODE computing device may also transmit delivery data to the user, such that the user may know when to expect delivery of the selected item, as well as whom to expect to deliver the selected item. Delivery data transmitted to the user may include a carrier identifier, an estimated delivery time, an estimated delivery time range, a delivery vehicle type, a delivery vehicle identifier, a GPS identifier, and a delivery vehicle driver identifier. Delivery data may include carrier availability data, carrier-related data from the carrier's registration profile, and/or additional data.

In the example embodiment, the ODE computing device is further configured to process a payment transaction for the selected item that includes an item price and a delivery fee. In some embodiments, prior to processing the payment transaction, the ODE computing device may be configured to receive a delivery confirmation for the selected item. A delivery confirmation may be received by the ODE computing device from the selected carrier, the user, or both. In some embodiments, processing the payment transaction may be dependent upon receiving a delivery confirmation. That is, if a delivery confirmation is not received, the payment transaction for the item price and delivery fee will not be processed. For instance, the ODE computing device may receive an authorization request message (such as ISO® 8583 compliant messages and ISO® 20022 compliant messages) from the merchant to obtain payment for the selected item (and additionally, in some embodiments, from the carrier to obtain payment for delivery), however, the ODE computing device may not relay the authorization request message to the payment network until a delivery confirmation has been received. Once the delivery confirmation is received at the ODE computing device, the authorization request message(s) are forwarded to the payment network to process and complete the payment transaction for both the item price and the delivery fee. According to one or more example embodiments, the ODE computing device may be in communication with the payment network or the ODE computing device may be integral to the payment network. In embodiments where the ODE computing device is integral to the payment network, payment authorization request messages received from a merchant or carrier may be processed immediately upon selection of a registered carrier and transmittal of a delivery task, or alternatively may be processed in response to a delivery confirmation being received at the ODE computing device for the selected item.

The ODE computing device is configured to receive payment data from the user to pay for the selected item and delivery fee. In embodiments where the registered merchant has selected to deliver the selected item, the payment transaction is processed by applying both the item price and the delivery fee to the registered merchant. Alternatively, in embodiments where the registered merchant has not selected to deliver the selected item, the payment transaction is processed by applying the item price to the registered merchant and applying the delivery fee to the selected carrier.

The OD system described herein, including the ODE computing device, provides an on-demand ecosystem through which delivery services are tied to purchase transactions, and both delivery carrier contracting and item purchase are completed at the time of payment.

The methods and systems described herein may be implemented using computer programming or engineering techniques including computer software, firmware, hardware, or any combination or subset therefor. At least one of the technical problems addressed by this system includes: (i) lack of on-demand delivery services particularly for same day, relatively short distance deliveries; (ii) lack of a purchasing experience that incorporates on-demand delivery contracting with item purchase; (iii) merchants, such as smaller merchants, that do not have their own delivery services; (iv) lack of real-time item tracking from pick-up to transit to delivery; (v) lack of user/consumer confidence when merchants and carriers are not registered and/or verified; and (vi) lack of a centralized database for storing on-demand delivery carrier availability data.

The technical effect of the systems and methods described herein is achieved by performing at least one of the following steps: (i) receiving item data from a registered merchant that includes one or more pick-up locations; (ii) receiving availability data from at least one registered carrier; (iii) displaying a searchable interface to a user that enables the user to search for item data from the registered merchant; (iv) receiving a selected item from the user via the searchable interface, wherein the selected item is offered for sale by the registered merchant and includes a selected pick-up location, wherein the selected item is to be delivered to the user from the selected pick-up location; (v) determining whether the registered merchant has selected to deliver the selected item to the user, wherein: when the registered merchant has selected to deliver the selected item, providing the availability data from the at least one registered carrier to the registered merchant and allowing the registered merchant to select one of the at least one registered carriers, and when the registered merchant has not selected to deliver the selected item, providing the availability data from the at least one registered carrier to the user and allowing the user to select one of the at least one registered carriers; and (vi) processing a payment transaction for the selected item that includes an item price and a delivery fee.

The resulting technical effect achieved by the systems and methods described herein is at least one of: (i) improved on-demand delivery services, particularly for same day, relatively short distances; (ii) improved on-demand purchase experiences because on-demand delivery carrier contracting is integrated into the item purchase transaction; (iii) greater selection of delivery options for users and merchants, especially for smaller merchants that do not have their own delivery service; (iv) more efficient delivery options for merchants and users for arranging purchased item delivery; (v) convenient, real-time item location tracking from pick-up to transit to delivery; (vi) increased user/consumer confidence for making item purchases from registered/verified merchants and having items delivered from registered/verified carriers; and (vii) improved storage for on-demand delivery carrier availability data.

In one embodiment, a computer program is provided, and the program is embodied on a computer-readable medium. In an example embodiment, the OD system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the OD system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein.

Each component and process can also be used in combination with other assembly packages and processes.

The following detailed description illustrates embodiments of the disclosure by way of example and not by way of limitation. It is contemplated that the disclosure has general application to providing an on-demand ecosystem in industrial, commercial, and residential applications.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party payment card system 100 for processing payment card transactions. The present disclosure relates to payment card system 100, such as a credit card payment system using the Mastercard® payment card system payment network 108 (also referred to as an "interchange" or "interchange network"). Mastercard® payment card system payment network 108 is a proprietary communications standard promulgated by Mastercard International Incorporated® for the exchange of financial transaction data between financial institutions that are members of Mastercard International Incorporated®. (Mastercard is a registered trademark of Mastercard International Incorporated located in Purchase, N.Y.).

In payment card system 100, a financial institution such as an issuer 110 issues a payment card for an account, such as a credit card account or a debit card account, to a cardholder 102, who uses the payment card to tender payment for a purchase from a merchant 104. To accept payment with the payment card, merchant 104 must normally establish an account with a financial institution that is part of the financial payment system. This financial institution is usually called the "merchant bank" or the "acquiring bank" or "acquirer bank" or simply "acquirer". When a cardholder 102 tenders payment for a purchase with a payment card (also known as a financial transaction card), merchant 104 requests authorization from acquirer 106 for the amount of the purchase. Such a request is referred to herein as an authorization request message (e.g., ISO® 8583 compliant messages and ISO® 20022 compliant messages). The request may be performed over the telephone, but is usually performed through the use of a point-of-interaction terminal, also referred to herein as a point-of-sale device, which reads the cardholder's account information from the magnetic stripe on the payment card and communicates electronically with the transaction processing computers of acquirer 106. Alternatively, acquirer 106 may authorize a third party to perform transaction processing on its behalf. In this case, the point-of-interaction terminal will be configured to communicate with the third party. Such a third party is usually called a "merchant processor" or an "acquiring processor."

For card-not-present (CNP) transactions, cardholder 102 provides payment information or billing data associated with the payment card electronically to merchant 104. The payment information received by merchant 104 is stored and transmitted to acquirer 106 and/or payment network 108 as part of an authorization request message. In some embodiments, merchant 104 transmits a plurality of authorization request messages together as a "batch" file to acquirer 106 and/or payment network 108.

Using payment card system payment network 108, the computers of acquirer 106 or the merchant processor will communicate with the computers of issuer 110, to determine whether the cardholder's account 112 is in good standing and whether the purchase is covered by the cardholder's available credit line or account balance. Based on these determinations, the request for authorization will be declined or accepted. If the request is accepted, an authorization code is issued to merchant 104.

When a request for authorization is accepted, the available credit line or available balance of cardholder's account 112 is decreased. Normally, a charge is not posted immediately to a cardholder's account because bankcard associations, such as Mastercard International Incorporated®, have promulgated rules that do not allow a merchant to charge, or "capture," a transaction until goods are shipped or services are rendered. When a merchant ships or delivers the goods or services, merchant 104 captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For debit card transactions, when a request for authorization is approved by the issuer, cardholder's account 112 is decreased. Normally, a charge is posted immediately to cardholder's account 112. The bankcard association then transmits the approval to the acquiring processor for distribution of goods/services, information, or cash in the case of an ATM.

After a transaction is captured, the transaction is settled between merchant 104, acquirer 106, and issuer 110. Settlement refers to the transfer of financial data or funds between the merchant's account, acquirer 106, and issuer 110 related to the transaction. Usually, transactions are captured and accumulated into a "batch," which is settled as a group.

Figure 2:
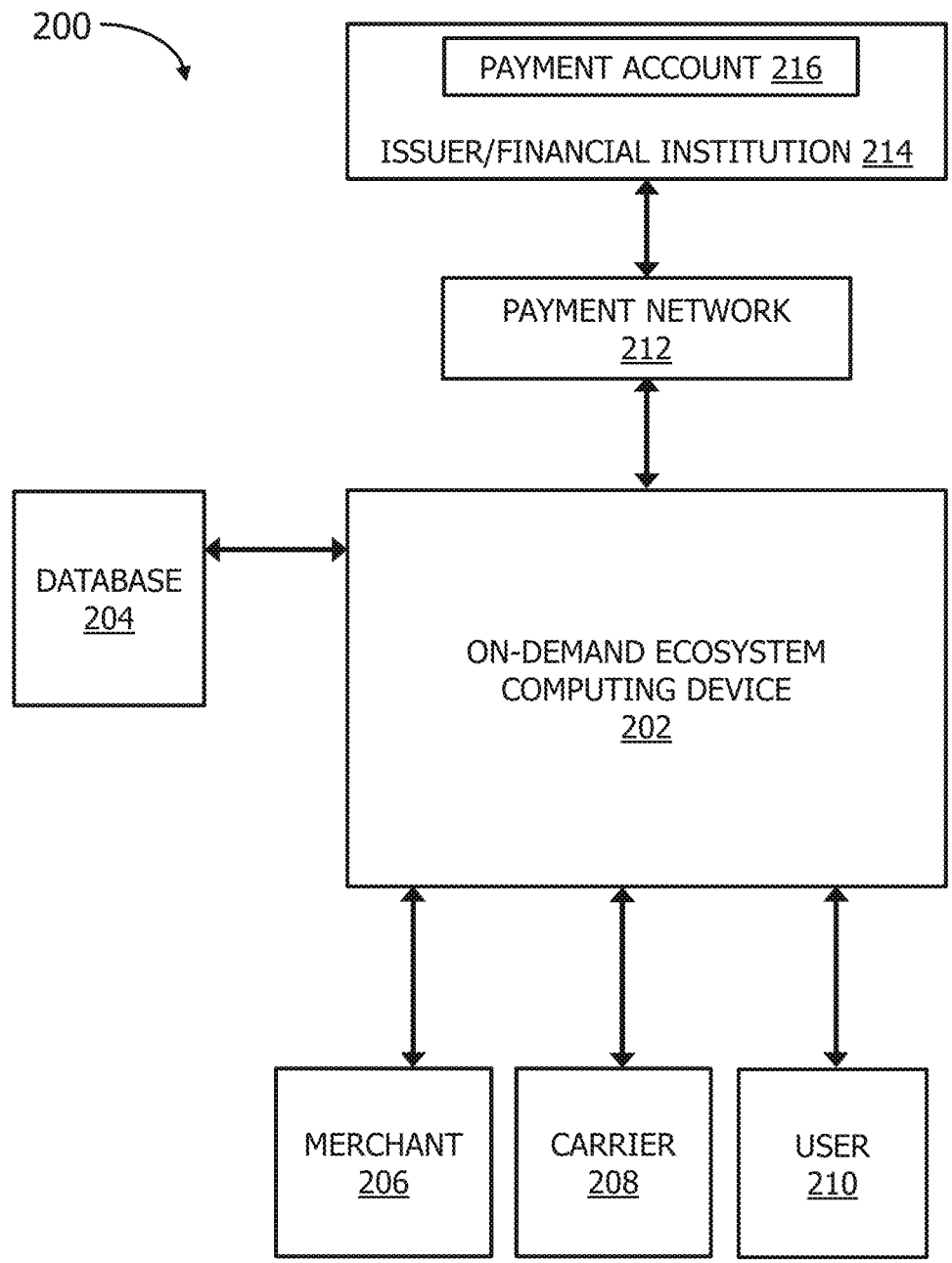

FIG. 2 is a block diagram of an example of an on-demand (OD) system 200 including an on-demand ecosystem (ODE) computing device 202. ODE computing device 202 includes at least one processor in communication with a memory. ODE computing device 202 is in communication with a database (memory) 204, merchant computing device(s) 206, carrier computing device(s) 208, user computing device(s) 210, and issuer/financial institution 214 via payment network 212. Payment network 212 may be similar to payment network 108 as shown in FIG. 1. Payment network 212 includes at least a payment processor for processing payment transactions. Payment network 212 may further include an issuer computing device (where the issuer is a bank or financial institution associated with a user (e.g., cardholder) and issues payment accounts/cards to the user), an acquirer computing device (where the acquirer is a bank or financial institution associated with a merchant, e.g., a merchant bank), a merchant computing device, and a user/cardholder payment card and/or computing device. Database 204 contains information on a variety of matters, including: item data, availability data, registered merchant listings, registered carrier listings, carrier selection rules, verification modules and/or any other information. In some embodiments, database 204 is stored on ODE computing device 202. In alternative embodiments, database 204 is stored remotely from ODE computing device 202 and may be non-centralized. OD system 200 is communicatively coupled to system 100 (shown in FIG. 1) to provide data, such as transaction and account data, to OD system 200.

In the example embodiment, payment network 212 is configured to receive/transmit transaction data from/to ODE computing device 202 to facilitate processing of payment transactions initiated via OD system 200. In some embodiments, ODE system 202 receives payment data from user 210. To complete a payment transaction, ODE computing device may transmit an authorization request message from merchant 206 to payment network 212 and issuer/financial institution 214. Upon approval, issuer/financial institution will transmit the appropriate funds via payment network 212 to ODE computing device 202 to apply payment for an item price and a delivery fee from payment account 216 that is associated with user 210. Depending on the embodiment, ODE computing device 202 may apply payment for both the item price and the delivery fee to merchant 206 (e.g., when merchant 206 selects a carrier 208), or ODE computing device 202 may apply payment for the item price to merchant 206 and apply payment for the delivery fee directly to carrier 208 (e.g., when user 210 selects a carrier 208).

In the example embodiment, OD system 200 further includes a plurality of client subsystems, also referred to as client/user systems such as merchant 206 computing device, carrier 208 computing device, and user (e.g., consumer/buyer) computing device 210. As described in greater detail herein, merchant 206 and carrier 208 computing devices may be associated with ODE computing device 202 by registering with ODE computing device 202. Computing devices 206, 208, 210 are computers including a web browser, such that ODE computing device 202 is accessible to user computing devices 206, 208, 210 using the Internet. Computing devices 206, 208, 210 may be any device capable of interconnecting to the Internet including a mobile computing device, such as a laptop or desktop computer, a web-based phone (e.g., a "smartphone"), a personal digital assistant (PDA), a tablet or phablet, a fitness wearable device, a smart refrigerator or other web-connectable appliance, a "smart watch" or other wearable device, or other web-connectable equipment. Although one merchant 206, one carrier 208, and one user 210 computing device is shown in FIG. 2, it should be understood that OD system 200 may include any number of merchants 206, carriers 208 and/or user 210 computing devices.

In one embodiment, ODE computing device 202 is configured to communicate with a merchant 206, carrier 208, or user 210 computing device. Computing devices 206, 208, 2010 are configured to display an app, for example, at a user interface (not shown) of computing device 206, 208, 210. Merchants 206 and/or carriers 208 may access the app to register/enroll with the ODE computing device 202. In some embodiments, merchants 206 and carriers 208 are automatically verified by ODE computing device 202. In certain embodiments, the merchants 206 and carriers 208 provide merchant-related data and carrier-related data, respectively, to ODE computing device 202 to facilitate generation of merchant 206 and carrier 208 profiles, which are stored in database 204. In some embodiments, the app providing access to the ODE computing device may have inter-app integration functionality, such that the on-demand ecosystem services of the app may be integrated with, for example, budgeting, invoicing, or inventory tracking services of another application.

Database 204 is communicatively coupled to ODE computing device 202. In other embodiments, database 204 is integrated with ODE computing device 202 or payment network 212 (e.g., a payment processor). Database 204 is configured to receive, store, and transmit data for the ODE computing device 202. In particular, database 204 may store item data, availability data, registered merchant listings, registered carrier listings, carrier selection rules, verification modules and/or any other information.

In the illustrated embodiment, ODE computing device 202 is in communication with a payment network 212. Payment network 212 is configured to process financial transactions thereover. Payment network 212 is in communication with a plurality of issuers/financial institutions 214 (e.g., banks), although only one issuer 214 is shown for clarity. Financial institution 214 maintains one or more payment accounts 216 associated with a user 210 (e.g., a consumer or buyer), such as a credit card account, debit account, or prepaid account. In some embodiments, ODE computing device 202 is integral to payment network 212 and in direct communication with financial institution 214.

Figure 3:
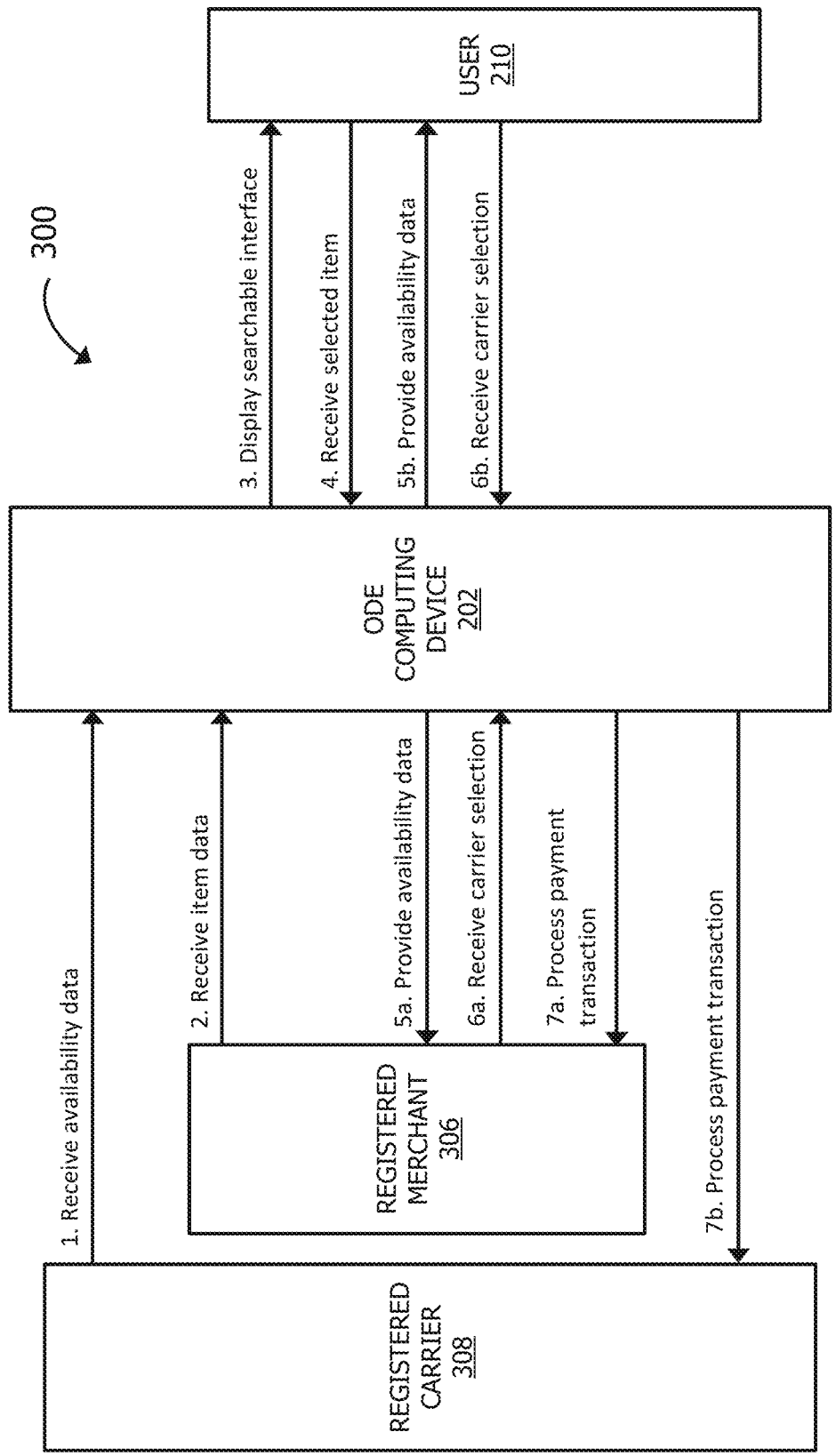

FIG. 3 is an example flow diagram illustrating the flow of data between various components of the OD system 200 (shown in FIG. 2). In particular, FIG. 3 depicts the data flow between ODE computing device 202, user 210, registered merchant 306 (similar to merchant 206 shown in FIG. 2), and registered carrier 308 (similar to carrier 208 shown in FIG. 2). Prior to the flow of data depicted in FIG. 3, merchant 206 and carrier 208 have registered with (and in some embodiments, been verified by) ODE computing device 202. In other embodiments, OD system 200 may provide additional, fewer, or alternative data and data flow, including those described elsewhere herein.

In the example embodiment, ODE computing device 202 receives availability data from registered carrier 308 (step 1). Availability data submitted by carrier 308 and received by ODE computing device 202 includes at least one of a carrier identifier (e.g., name, address, locations), available delivery days, available delivery times, available delivery vicinity (e.g., geographic locations and/or boundaries, cities, towns, counties, neighborhoods, streets, etc.), minimum and/or maximum trip distance (e.g., distance from pick-up location to delivery location), a delivery fee or fee range, a delivery vehicle type (e.g., compact car, mid-size car, small truck (e.g., Subaru Brat, Ford Ranger), large truck (e.g., Ford F150, F250, F350), a delivery vehicle identifier (make, model, color, license plate number), a delivery vehicle GPS identifier, and a delivery vehicle driver identifier (e.g., driver name, driver license number, photograph, mobile device contact information such as phone number).

ODE computing device receives item data from registered merchant 306 (step 2). Item data submitted by merchant 306 and received by ODE computing device 202 includes at least one item offered for sale by the merchant, as well as the physical location(s) at which the item is available for pick-up. Item data may further include details about each item, such as an item name, an image of the item, a description of the item, an item price, and an item identifier (e.g., a stock keeping unit (SKU) number, bar code, catalog number, etc.).

The ODE computing device 202 then provides/displays a searchable interface to user 210 that enables user 210 to search (or browse) for item data from the registered merchant 306 (step 3). User 210 may search or browse the searchable interface to view items offered for sale by any or all of the registered merchants 306. The user 210 may search or browse, for example, by merchant, item type/category, item name, item price, etc.

ODE computing device 202 receives a selected item from the user via the searchable interface (step 4). The selected item is an item being offered for sale by a registered merchant 306, includes a selected pick-up location, and is to be delivered to the user from the selected pick-up location. Prior to processing a payment transaction (steps 7a and 7b) for the selected item, a registered carrier 308 will be contracted (by either the merchant 306 or the user 210, steps 6a and 6b) to deliver the selected item based on availability data provided to the ODE computing device 202 by the carrier 308 at step 1.

ODE computing device 202 then determines whether the registered merchant 306 has selected to deliver the selected item to the user 210. Depending on the embodiment, either the merchant 306 or the user 210 will select a carrier to deliver the item (step 6a or 6b, respectively). When ODE computing device 202 determines that the merchant 306 has selected to deliver the selected item, ODE computing device 202 provides the availability data from the registered carriers 308 to the merchant 306 (step 5a) and allows the merchant 306 to select one of the carriers 308 (step 6a). Alternatively, when ODE computing device 202 determines that the registered merchant 306 has not selected to deliver the selected item, the ODE computing device 202 provides the availability data from the registered carriers 308 to the user 210 (step 5b) and allows the user 210 to select one of the registered carriers 308 (step 6b). In some embodiments, the ODE computing device 202 may filter carriers 308 according to availability data prior to providing the availability data to a merchant 306 or user 210 (step 5a or 5b) for carrier selection (step 6a or 6b). In these embodiments, only carriers 308 with availability data that is applicable to delivering the selected item at the relevant day, time, location, etc. will be displayed to the merchant 306 or user 210 for carrier selection at step 5a or 5b, respectively.

In some embodiments, subsequent to receiving a carrier selection from a merchant 306 or user 210 (step 6a or 6b), the ODE computing device 202 may query the selected carrier 308 (not shown) to accept or decline delivery of the selected item from the pick-up location to the user 210. In these embodiments, if the initially selected carrier 308 declines to deliver the selected item, the ODE computing device 202 will allow a different one of the registered carriers 308 to be selected by the merchant 306 or user 210 (step 6a or 6b). In some embodiments, once a registered carrier 308 has been selected (step 6a or 6b), the ODE computing device 202 is configured to transmit a delivery task to the selected carrier 308, wherein the delivery task includes at least the selected pick-up location, a selected item identifier, and a delivery location. In some embodiments, the ODE computing device 202 will further update the availability data of the selected carrier 308 based on the delivery task transmitted to the selected carrier 308. In some embodiments, the ODE computing device 202 may also transmit delivery data to the user 210, such that the user 210 may know when to expect delivery of the selected item, as well as whom to expect to deliver the selected item. Delivery data transmitted to the user may include a carrier identifier, an estimated delivery time, an estimated delivery time range, a delivery vehicle type, a delivery vehicle identifier, a GPS identifier, and a delivery vehicle driver identifier.

Following carrier selection (step 6a or 6b), ODE computing device 202 processes a payment transaction (steps 7a and 7b) for the selected item that includes an item price and a delivery fee. In some embodiments, prior to processing the payment transaction, the ODE computing device 202 may be configured to receive a delivery confirmation for the selected item. A delivery confirmation may be received by the ODE computing device 202 from the selected carrier 308, the user 210, or both. In some embodiments, processing the payment transaction may be dependent upon receiving a delivery confirmation. In these embodiments, if a delivery confirmation is not received, the payment transaction for the item price and delivery fee will not be processed.

In some embodiments, ODE computing device 202 receives payment data from the user 210 to pay for the selected item and delivery fee. In embodiments when the registered merchant 306 has selected to deliver the selected item, the payment transaction is processed by applying both the item price and the delivery fee to the registered merchant 306 (step 7a only). Alternatively, in embodiments when the registered merchant 306 has not selected to deliver the selected item, the payment transaction is processed by applying the item price to the registered merchant 306 and applying the delivery fee to the selected carrier 308 (both steps 7a and 7b).

Figure 4:
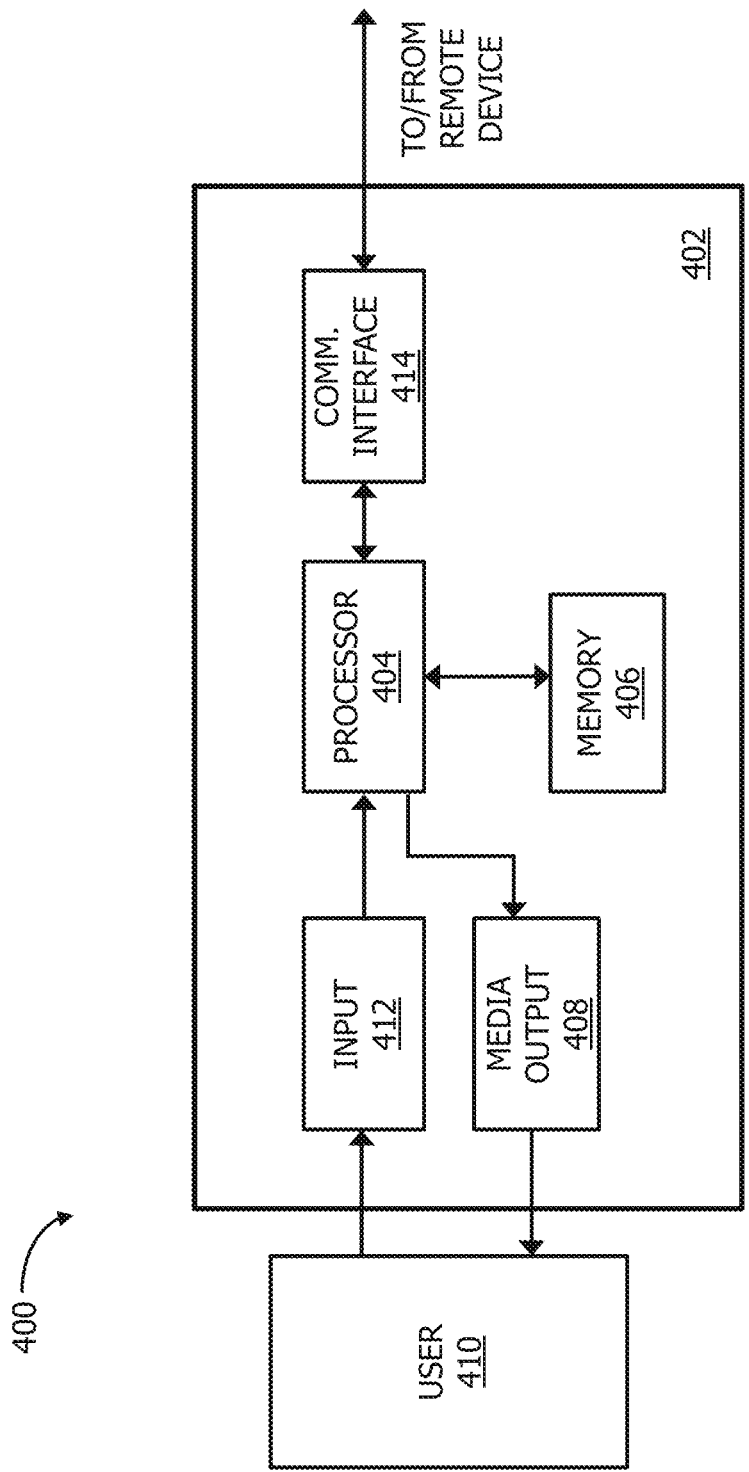

FIG. 4 depicts an exemplary configuration of a remote or client computing device 402, such as merchant 206, carrier 208, and user 210 computing devices (shown in FIG. 2). Computing device 402 includes a processor 404 for executing instructions. In some embodiments, executable instructions are stored in a memory area 406. Processor 404 may include one or more processing units (e.g., in a multi-core configuration). Memory area 406 is any device allowing information such as executable instructions and/or other data to be stored and retrieved. Memory area 406 may include one or more computer-readable media.

Client computing device 402 also includes at least one media output component 408 for presenting information to a user 410. Media output component 408 is any component capable of conveying information to user 410. In some embodiments, media output component 408 includes an output adapter such as a video adapter and/or an audio adapter. An output adapter is operatively coupled to processor 404 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 408 is configured to present an interactive user interface (e.g., a web browser or client application) to user 410.

In some embodiments, client computing device 402 includes an input device 412 for receiving input from user 410. Input device 412 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 408 and input device 412.

Computing device 402 may also include a communication interface 414, which is communicatively coupleable to a remote device such as ODE computing device 202 (shown in FIG. 2). Communication interface 414 may include, for example, a wired or wireless network adapter or a wireless data transceiver for use with a mobile phone network (e.g., Global System for Mobile communications (GSM), 3G, 4G, or Bluetooth) or other mobile data network (e.g., Worldwide Interoperability for Microwave Access (WIMAX)).

Stored in memory area 406 are, for example, computer-readable instructions for providing a user interface to user 410 via media output component 408 and, optionally, receiving and processing input from input device 412. A user interface may include, among other possibilities, a web browser and client application. Web browsers enable users 410 to display and interact with media and other information typically embedded on a web page or a website from a web server associated with, for example, a merchant. A client application allows users 410 to interact with a server application associated with, for example, ODE computing device 202 and/or other components of OD system 200 (shown in FIG. 2). For instance, in some embodiments, client computing device 402 is configured as merchant computing device 206 and user 410 may be exemplified as a merchant interacting with ODE computing device 202 via media output component 408 and input device 412 to submit item data (see step 2 in FIG. 3) and select a delivery carrier (see step 6a in FIG. 3). As another example, in some embodiments, client computing device 402 is configured as carrier computing device 208 and user 410 may be exemplified as a delivery person interacting with ODE computing device 202 via media output component 408 and input device 412 to submit carrier availability data (see step 1 in FIG. 3), and additionally receive a delivery task and submit a delivery confirmation.

Figure 5:
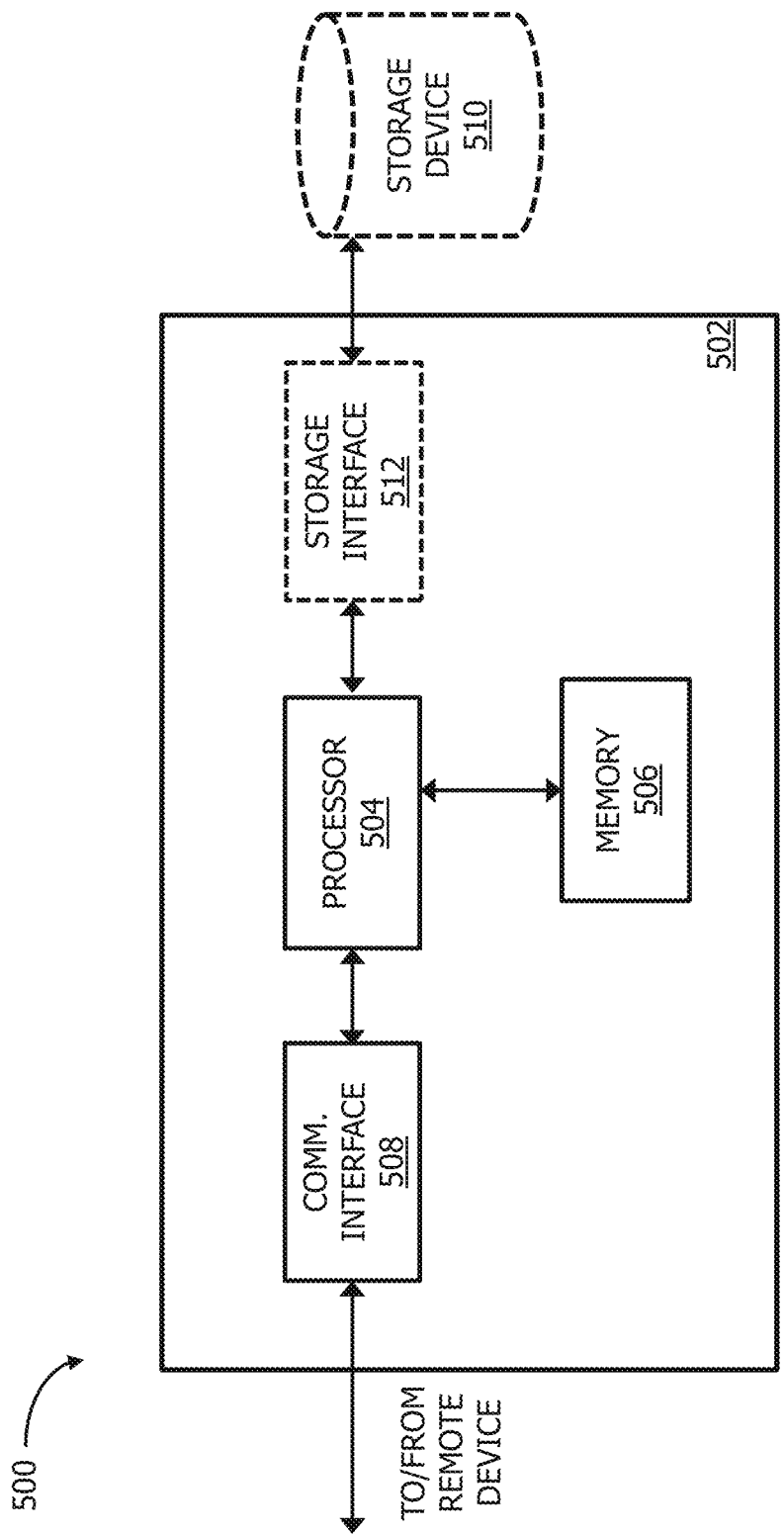

FIG. 5 illustrates an example configuration of a server computing device 502, such as ODE computing device 202 and payment network 212 (shown in FIG. 2). Server computing device 502 includes a processor 504 for executing instructions. Instructions may be stored in a memory area 506, for example. Processor 504 may include one or more processing units (e.g., in a multi-core configuration).

Processor 504 is operatively coupled to a communication interface 508 such that server computing device 502 is capable of communicating with a remote device such as computing device 402 shown in FIG. 4 or another server computing device 502. For example, communication interface 508 of ODE computing device 202 may receive various data from merchant 206, carrier 208, and user 210 computing devices via the Internet, as illustrated in FIG. 2. As another example, communication interface 508 of payment network 212 may receive authorization requests from ODE computing device 202 to complete payment transactions initiated via OD system 200.

Processor 504 may also be operatively coupled to a storage device 510. Storage device 510 is any computer-operated hardware suitable for storing and/or retrieving data. In some embodiments, storage device 510 is integrated in server computing device 502. For example, server computing device 502 may include one or more hard disk drives as storage device 510. In other embodiments, storage device 510 is external to server computing device 502 and may be accessed by a plurality of server computing devices 502. For example, storage device 510 may include multiple storage units such as hard disks or solid state disks in a redundant array of inexpensive disks (RAID) configuration. Storage device 510 may include a storage area network (SAN) and/or a network attached storage (NAS) system.

In some embodiments, processor 502 is operatively coupled to storage device 510 via a storage interface 512. Storage interface 512 is any component capable of providing processor 504 with access to storage device 510. Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 504 with access to storage device 510.

Memory areas 406 (shown in FIG. 4) and 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are for example only, and are thus not limiting as to the types of memory usable for storage of a computer program.

Figure 6:
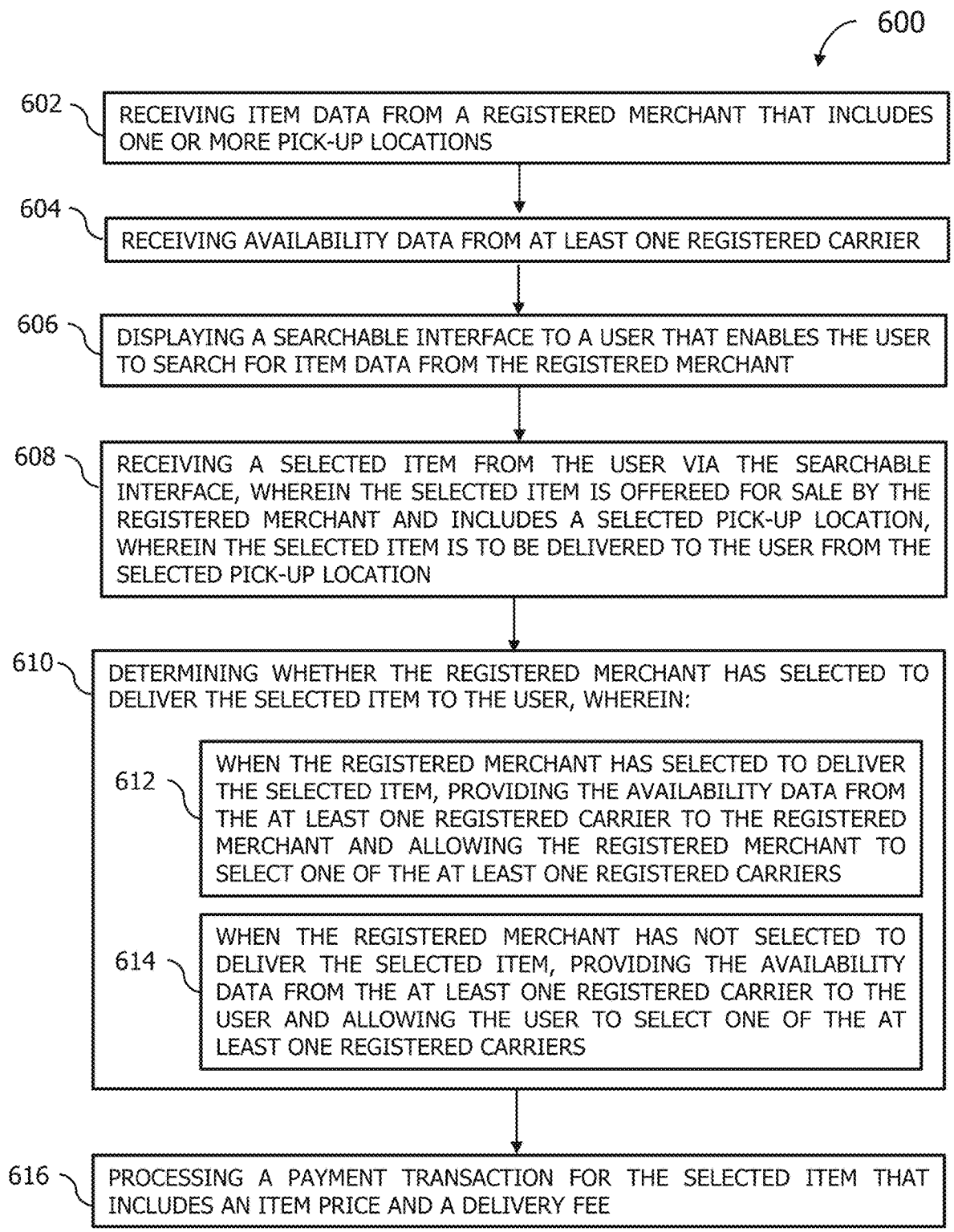

FIG. 6 is a flowchart of a method 600 for providing an on-demand ecosystem, such as system 200 (shown in FIG. 2). In the example embodiment, method 600 is performed by an ODE computing device, such as ODE computing device 202 (shown in FIG. 2). In certain embodiments, method 600 may be at least partially performed by a different computing device. In other embodiments, method 600 may include additional, fewer, or alternative actions, including those described elsewhere herein.

Method 600 begins with the ODE computing device receiving 602 item data from a registered merchant that includes one or more pick-up locations, and receiving 604 availability data from at least one registered carrier. The ODE computing device also provides 606 a searchable interface to a user that enables the user to search for item data from the registered merchant, and subsequently receives 608 a selected item from the user via the searchable interface. The selected item is offered for sale by the registered merchant and includes a selected pick-up location. The selected item is to be delivered to the user from the selected pick-up location. The ODE computing device then determines 610 whether the registered merchant has selected to deliver the selected item to the user. When the registered merchant has selected to deliver the selected item, ODE computing device provides 612 the availability data from the at least one registered carrier to the registered merchant and allows the registered merchant to select one of the at least one registered carriers. When the registered merchant has not selected to deliver the selected item, ODE computing device provides 614 the availability data from the at least one registered carrier to the user and allows the user to select one of the at least one registered carriers. The method further includes processing 616 (by the ODE computing device) a payment transaction for the selected item that includes an item price and a delivery fee.

In some embodiments, method 600 further includes receiving a delivery decline from the selected carrier. The ODE computing device would consequently allow a different one of the at least one registered carriers carrier to be selected (by either the merchant or the user, depending on the embodiment). In some embodiments, method 600 includes transmitting a delivery task to the selected carrier, which notifies the carrier that they have been selected to pick-up and deliver an item. The delivery task may include the selected pick-up location, an identifier for the selected item, and a delivery location. The delivery task may also include a scheduled pick-up time or time range during which the registered merchant can expect the selected carrier to pick-up the selected item, and a scheduled delivery time or time range during which the user can expect the selected carrier to deliver the selected item. Depending on the embodiment, the selected carrier may confirm the scheduled pick-up and/or delivery time(s), or may adjust the scheduled time(s) in a response to the transmitted delivery task. In other embodiments, in which the selected carrier does not receive scheduled pick-up and/or delivery time(s) in the transmitted delivery task, the selected carrier may submit scheduled pick-up and/or delivery time(s) to the ODE computing device in a response to the transmitted delivery task. Accordingly, in some embodiments, method 600 includes updating the availability data of the selected carrier based on the delivery task transmitted to the selected carrier. For instance, in these embodiments, scheduled pick-up and/or delivery time(s) or time range(s) can be used to update the availability for the selected carrier by removing those times, on that particular day, to prevent double-booking the selected carrier on that particular day at those times.

In some embodiments, method 600 includes transmitting delivery data to the user, such that the user may be informed about when the item will be delivered and can recognize the carrier upon delivery. Delivery data includes at least one of a carrier identifier, an estimated delivery time or time range (corresponding to the scheduled delivery time), a delivery vehicle type, a delivery vehicle identifier, a GPS identifier, and a delivery vehicle driver identifier. In some embodiments, method 600 includes receiving a delivery confirmation for the selected item, where the delivery confirmation may be received from the selected carrier, from the user, or both. In some embodiments, method 600 includes receiving payment data from the user to be used in processing 616 the payment transaction. In some embodiments, the payment transaction may be processed by the ODE computing device only after a delivery confirmation has been received by the ODE computing device. In some embodiments, when the registered merchant has selected to deliver the selected item, processing 616 the payment transaction includes applying both the item price and the delivery fee to the registered merchant. In other embodiments, when the registered merchant has not selected to deliver the selected item, processing 616 the payment transaction includes applying the item price to the registered merchant and applying the delivery fee to the selected carrier.

Figure 7:
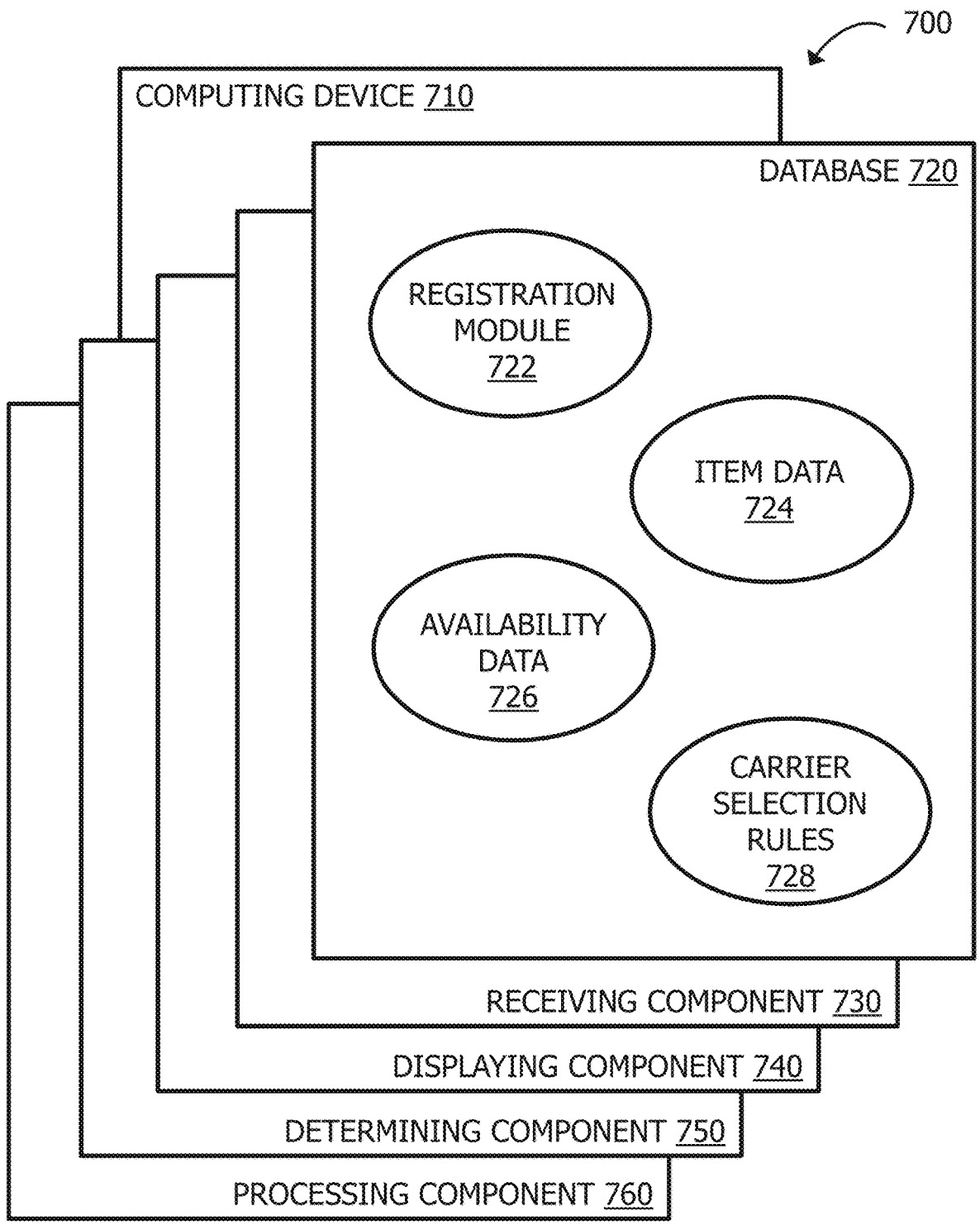

FIG. 7 is a diagram 700 of components of an example computing device 710 that may be used in method 600 shown in FIG. 6. In some embodiments, computing device 710 is similar to ODE computing device 202 (shown in FIG. 2). Computing device 710 includes a database 720 configured to store various information. Database 720 may be similar to database 204 (shown in FIG. 2). Database 720 may be coupled with several separate components within computing device 710, which perform specific tasks. In the illustrated embodiment, database 720 is divided into a plurality of sections and stores, including but not limited to, a registration module section 722, an item data section 724 (which may include and/or be similar to item data received at step 2, shown in FIG. 3), an availability data section 726 (which may include and/or be similar to availability data received at step 1, shown in FIG. 3), and a carrier selection rules section 728. Database 720 is interconnected to computing device 710 to receive, transmit, and/or update the information as required.

In the example embodiment, computing device 710 includes a receiving component 730 configured to receive item data from a registered merchant and availability data from a registered carrier. Computing device 710 further comprises a displaying component 740 configured to display a searchable interface to a user that enables the user to search (or browse) item data from the registered merchant. Receiving component 730 is also configured to receive a selected item from the user via the searchable interface. The selected item is offered for sale by the registered merchant and includes a selected pick-up location, and the selected item is to be delivered to the user from the selected pick-up location. Computing device 710 further includes a determining component 750 configured to determine whether the registered merchant has selected to deliver the selected item to the user. When the registered merchant has selected to deliver the selected item, determining component 750 is additionally configured to provide the availability data from the at least one registered carrier to the registered merchant and allow the registered merchant to select one of the at least one registered carriers. When the registered merchant has not selected to deliver the selected item, determining component 750 is additionally configured to provide the availability data from the at least one registered carrier to the user and allow the user to select one of the at least one registered carriers. Computing device 710 also comprises a processing component 760 configured to process a payment transaction for the selected item that includes an item price and a delivery fee.

Described herein are computer systems such as a payment processor (such as a payment network), a remote device (such as a merchant computing device, a carrier computing device, and a user computing device) and an ODE computing device. As described herein, all such computer systems include a processor and a memory.

Further, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

The term processor, as used herein, refers to central processing units, microprocessors, microcontrollers, reduced instruction set circuits (RISC), application specific integrated circuits (ASIC), logic circuits, and any other circuit or processor capable of executing the functions described herein. The above examples are for example only, and are thus not intended to limit in any way the definition and/or meaning of the term "processor."

The term database, as used herein, refers to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

As used herein, the terms "software" and "firmware" are interchangeable, and include any computer program stored in memory for execution by a processor (e.g., 304, 404), including RAM memory, ROM memory, EPROM memory, EEPROM memory, and non-volatile RAM (NVRAM) memory. The above memory types are example only, and are thus not limiting as to the types of memory usable for storage of a computer program.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, and/or computers. Each type of transaction card can be included in payment data received by the ODE computing device and used as a method of payment for performing a transaction.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

In addition, although various elements of the ODE computing device are described herein as including general processing and memory devices, it should be understood that the ODE computing device is a specialized computer configured to perform the steps described herein for providing an on-demand ecosystem to integrate on-demand delivery services within purchase transactions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An on-demand ecosystem (ODE) computing device including a processor in communication with a memory, said processor programmed to:
   receive, via the Internet, item data from a merchant computing device of a registered merchant, wherein the item data includes one or more pick-up locations;
   receive, via the Internet, carrier availability data from at least one carrier computing device corresponding to at least one registered carrier, the carrier availability data identifying a local geographic area within which the at least one carrier delivers;
   store, in a database, the item data and the carrier availability data;
   cause to be displayed, via Internet communication with an application executing on a user computing device, a searchable interface to a user that enables the user to search the database for item data from the registered merchant;
   receive, via the Internet from the application executing on the user computing device, a selected item from the user via the searchable interface, wherein the selected item is offered for sale by the registered merchant and includes a selected pick-up location, wherein the selected item is to be delivered to the user from the selected pick-up location;
   provide, from the database via the Internet, the carrier availability data from the at least one registered carrier to the application executing on the user computing device and receive, from the application via the Internet, a selection of a selected carrier from among the at least one registered carrier based on the carrier availability data;
   receive, in response to a query via the Internet to the selected carrier to accept delivery of the selected item from the selected pick-up location to the user, a delivery acceptance from the selected carrier;
   transmit, in response to receiving the delivery acceptance from the selected carrier, a delivery task to the selected carrier wherein the delivery task includes the selected pick-up location, a selected item identifier, and a delivery location;
   transmit, via a payment network, an authorization request message from the merchant computing device to an issuer computing device associated with an issuer of a payment account of the user, wherein the authorization request message i) requests authorization for a payment transaction for the selected item that includes an item price and a delivery fee, and ii) is formatted according to a proprietary communications standard promulgated by the payment network for the exchange of financial transaction data between financial institutions that are members of the payment network;
   receive, via the payment network, an authorization response message from the issuer computing device authorizing the payment transaction; and
   in response to the authorization of the payment transaction, credit, via the payment network, the item price to the account of the merchant and the delivery fee to an account of the selected carrier.

2. The ODE computing device of claim 1, wherein the carrier availability data from the at least one registered carrier includes at least one of a carrier identifier, available delivery days, available delivery times, minimum length of trip, maximum length of trip, a delivery fee, a delivery vehicle type, a delivery vehicle identifier, a GPS identifier, and a delivery vehicle driver identifier.

3. The ODE computing device of claim 1, wherein the item data further includes at least one of an image of the item, a description of the item, the item price, an estimated item price, and an item identifier.

4. The ODE computing device of claim 1, wherein said processor is further programmed to receive, in response to the query via the Internet to the selected carrier to accept delivery of the selected item from the selected pick-up location to the user, a delivery decline from an initially selected carrier and receive, from the application via the Internet, a different carrier from among the at least one registered carrier to be selected as the selected carrier.

5. The ODE computing device of claim 1, wherein said processor is further programmed to update, in response to receiving the delivery acceptance from the selected carrier, the item data and the carrier availability data of the selected carrier stored in the database based on the delivery task transmitted to the selected carrier.

6. The ODE computing device of claim 1, wherein said processor is further programmed to transmit delivery data to the user that includes at least one of a carrier identifier, an estimated delivery time, an estimated delivery time range, a delivery vehicle type, a delivery vehicle identifier, a GPS identifier, and a delivery vehicle driver identifier.

7. The ODE computing device of claim 1, wherein said processor is further programmed to, prior to processing the payment transaction, receive a delivery confirmation for the selected item and wherein the delivery confirmation is received from at least one of the selected carrier and the user.

8. A method for providing an on-demand ecosystem, said method performed using an on-demand ecosystem computing device including a processor in communication with a memory, said method comprising:
   receiving, via the Internet, item data from a merchant computing device of a registered merchant, wherein the item data includes one or more pick-up locations;
   receiving, via the Internet, carrier availability data from at least one carrier computing device corresponding to at least one registered carrier, the carrier availability data identifying a local geographic area within which the at least one carrier delivers;
   storing, in a database, the item data and the carrier availability data;
   causing to be displayed, via Internet communication with an application executing on a user computing device, a searchable interface to a user that enables the user to search the database for item data from the registered merchant;
   receiving, via the Internet from the application executing on the user computing device, a selected item from the user via the searchable interface, wherein the selected item is offered for sale by the registered merchant and includes a selected pick-up location, wherein the selected item is to be delivered to the user from the selected pick-up location;
   determining whether the registered merchant has selected to deliver the selected item to the user, wherein:
      when the registered merchant has selected to deliver the selected item, providing, from the database via the Internet, the carrier availability data from the at least one registered carrier to the merchant computing device of the registered merchant and receiving, via the Internet from the merchant computing device, a selection of a selected carrier from among the at least one registered carrier based on the carrier availability data; and
      when the registered merchant has not selected to deliver the selected item, providing, from the database via the Internet, the carrier availability data from the at least one registered carrier to the application executing on the user computing device and receiving, from the application via the Internet, a selection of a selected carrier from among the at least one registered carrier based on the carrier availability data;
   receiving, in response to querying the selected carrier via the Internet to accept delivery of the selected item from the selected pick-up location to the user, a delivery acceptance from the selected carrier;
   transmitting, in response to receiving the delivery acceptance from the selected carrier, a delivery task to the selected carrier wherein the delivery task includes the selected pick-up location, a selected item identifier, and a delivery location;
   transmitting, via a payment network, an authorization request message from the merchant computing device to an issuer computing device associated with an issuer of a payment account of the user, wherein the authorization request message i) requests authorization for a payment transaction for the selected item that includes an item price and a delivery fee, and ii) is formatted according to a proprietary communications standard promulgated by the payment network for the exchange of financial transaction data between financial institutions that are members of the payment network;
   receiving, via the payment network, an authorization response message from the issuer computing device authorizing the payment transaction; and
   in response to the authorization of the payment transaction:
      when the registered merchant has selected to deliver the selected item, crediting, via the payment network, the item price and the delivery fee to an account of the merchant; and
      when the registered merchant has selected not to deliver the selected item, crediting, via the payment network, the item price to the account of the merchant and the delivery fee to an account of the selected carrier.

9. The method of claim 8, wherein receiving the carrier availability data from the at least one registered carrier includes receiving at least one of a carrier identifier, available delivery days, available delivery times, minimum length of trip, maximum length of trip, a delivery fee, a delivery vehicle type, a delivery vehicle identifier, a GPS identifier, and a delivery vehicle driver identifier.

10. The method of claim 8, wherein receiving item data further includes receiving at least one of an image of the item, a description of the item, the item price, an estimated item price, and an item identifier.

11. The method of claim 8, further comprising receiving, in response to querying the selected carrier via the Internet to accept delivery of the selected item from the selected pick-up location to the user, a delivery decline from an initially selected carrier and allowing a different carrier from among the at least one registered carrier to be selected as the selected carrier.

12. The method of claim 8, further comprising updating the carrier availability data of the selected carrier based on the delivery task transmitted to the selected carrier.

13. The method of claim 8, further comprising transmitting delivery data to the user that includes at least one of a carrier identifier, an estimated delivery time, an estimated delivery time range, a delivery vehicle type, a delivery vehicle identifier, a GPS identifier, and a delivery vehicle driver identifier.

14. The method of claim 8, further comprising, prior to processing the payment transaction, receiving a delivery confirmation for the selected item, wherein the delivery confirmation is received from at least one of the selected carrier and the user.

15. A non-transitory computer-readable storage medium having computer-executable instructions embodied thereon, wherein when executed by an on-demand ecosystem (ODE) computing device including at least one processor coupled to a memory, the computer-executable instructions cause the ODE computing device to:
   receive, via the Internet, item data from a merchant computing device of a registered merchant, wherein the item data includes one or more pick-up locations;

receive, via the Internet, carrier availability data from at least one carrier computing device corresponding to at least one registered carrier, the carrier availability data identifying a local geographic area within which the at least one carrier delivers;

store, in a database, the item data and the carrier availability data;

cause to be displayed, via Internet communication with an application executing on a user computing device, a searchable interface to a user that enables the user to search the database for item data from the registered merchant;

receive, via the Internet from the application executing on the user computing device, a selected item from the user via the searchable interface, wherein the selected item is offered for sale by the registered merchant and includes a selected pick-up location, wherein the selected item is to be delivered to the user from the selected pick-up location;

determine whether the registered merchant has selected to deliver the selected item to the user, wherein:

when the registered merchant has selected to deliver the selected item, provide, from the database via the Internet, the carrier availability data from the at least one registered carrier to the merchant computing device of the registered merchant and receive, via the Internet from the merchant computing device, a selection of a selected carrier from among the at least one registered carrier based on the carrier availability data; and when the registered merchant has not selected to deliver the selected item, provide, from the database via the Internet, the carrier availability data from the at least one registered carrier to the application executing on the user computing device and receive, from the application via the Internet, a selection of a selected carrier from among the at least one registered carrier based on the carrier availability data; and receive, in response to a query via the Internet to the selected carrier to accept delivery of the selected item from the selected pick-up location to the user, a delivery acceptance from the selected carrier;

transmit, in response to receiving the delivery acceptance from the selected carrier, a delivery task to the selected carrier wherein the delivery task includes the selected pick-up location, a selected item identifier, and a delivery location;

transmit, via a payment network, an authorization request message from the merchant computing device to an issuer computing device associated with an issuer of a payment account of the user, wherein the authorization request message i) requests authorization for a payment transaction for the selected item that includes an item price and a delivery fee, and ii) is formatted according to a proprietary communications standard promulgated by the payment network for the exchange of financial transaction data between financial institutions that are members of the payment network;

receive, via the payment network, an authorization response message from the issuer computing device authorizing the payment transaction; and in response to the authorization of the payment transaction:

when the registered merchant has selected to deliver the selected item, credit, via the payment network, the item price and the delivery fee to an account of the merchant; and when the registered merchant has selected not to deliver the selected item, credit, via the payment network, the item price to the account of the merchant and the delivery fee to an account of the selected carrier.

\* \* \* \* \*